United States Patent [19]

Vandervort

[11] 4,114,236
[45] Sep. 19, 1978

[54] HINGE STRUCTURE FOR PLATEN COVERS

[75] Inventor: John D. Vandervort, Cottage Grove, Minn.

[73] Assignee: Minnesota Mining & Manufacturing Company, St. Paul, Minn.

[21] Appl. No.: 819,764

[22] Filed: Jul. 28, 1977

[51] Int. Cl.² ............................................. E05D 11/10
[52] U.S. Cl. ...................................... 16/142; 220/335
[58] Field of Search ......................... 16/139, 142, 145; 220/335, 342, 343

[56] References Cited

U.S. PATENT DOCUMENTS

| 3,833,964 | 9/1974 | Harcourt | 16/145 |
| 3,857,198 | 12/1974 | Post | 16/142 X |
| 3,888,386 | 6/1975 | Svensson | 220/335 |

Primary Examiner—Ronald Feldbaum
Attorney, Agent, or Firm—Cruzan Alexander; Donald M. Sell; John C. Barnes

[57] ABSTRACT

The hinge structure which permits the platen cover to be forced toward the platen when positioned thereover and which will hold the cover in any desired positon between about 20° and 90° with respect to the platen. The hinge structure comprises a leaf spring on the machine frame which is urged into contact with a cam surface connected to the cover which cam surface in cooperation with the leaf spring provides a torsional force about the cover axis to counterbalance the weight of the cover and a frictional force which will maintain the cover in its desired fixed position.

5 Claims, 3 Drawing Figures

HINGE STRUCTURE FOR PLATEN COVERS

BACKGROUND OF THE INVENTION

1. Field of the Invention

This application is related to spring maintained hinges and in particular to hinges of the type used in copy machines to hold the covers in raised position and to hold them in compressing position to flaten the original against a platen.

BACKGROUND OF THE PRIOR ART

In a copy machine it is generally desirable to raise the cover off the platen upon which an original to be exposed is supported such that the original can be taken off and replaced by another. It is desirable that this be done without lifting a hinged cover each time to a vertical position or therepast against a stop member.

An example of a support frame for counterbalancing a hinged cover is found in U.S. Pat. No. 3,414,933, issued Dec. 10, 1968 to Gronbach. The structure illustrated in this patent comprises a plurality of pieces which increase the expense of the system and the parts are big and expensive. Other examples for using resiliently biased locking hinges include U.S. Pat. No. 3,860,995, issued Jan. 21, 1975, to Lautenschlager, Jr. et al. This patent illustrates a hinged cover for use with furniture. In this patent the hinge and the locking action afforded by the spring is produced by the use of a variety of parts. The most pertinent embodiment in this patent to the structure of the present invention is FIG. 6 which is an embodiment wherein the cam surface profile of the plastic control portion of the fixed locking element is formed on an axis other than that of the hinge pivot pin affording a variation in the locking spring action achieved by the spring 25'. This patent does not teach however that the spring can be used to counterbalance the cover and hold the same in any desired position. The structure of this patent is designed to achieve a biased closing movement which will resiliently bias the door to the closed position and which may be utilized to urge the door to an open position after being moved past a dead center position.

Other prior art is known wherein a spring is utilized against a portion of a hinge member to urge the same in one direction or another and these references include U.S. Pat. No. 201,314, issued Mar. 12, 1878 to Warner and U.S. Pat. No. 3,237,239, issued Mar. 1, 1966 to Rudnick. In each of these instances a leaf spring is used to engage a cam surface on a relatively movable hinge member to urge the hinge member in a predetermined direction. In neither of these instances however is there a teaching of using the spring to counterbalance the weight of one member relative to another by the use of a spring and the relatively movable cam portion.

In the present invention a flexible leaf spring of considerable width applies sufficient force and frictional drag over a wide area on a cam surface to hold the cover in any raised position between about 20° and 90°. The cam permits a lot of pressure to be applied thereto and can be made of an inexpensive material, such that the force does not cause a deleterious wearing, compression or breakage of the material. The cam associated with the leaf spring is so formed that the spring and cam cooperate to counterbalance the cover as it is raised from a biased closed position to an open position at an angle of between 20° and 90° with respect to the surface over which it is normally resting.

SUMMARY OF THE INVENTION

The present invention affords a spring biased hinge for use in supporting a cover for the copy machine platen upon which the original to be copied is normally placed. The supporting hinge comprises a latching spring in the form of a wide leaf spring positioned along one edge of a cover, a large surface cam secured to the cover and which extends across the width of the leaf spring to engage the leaf spring along its width, and the hinge pin. The cam has a locking surface portion which when engaged by the cam forces the cover to a position toward and against the platen. Upon raising the cover the spring is moved from the locking surface portion of the cam to the transition surface wherein the cam begins to apply a torsional force to the cover to balance the weight of the cover such that the cover may be stopped and held in any position between 20° with respect to the platen and 90° with respect thereto. The leaf spring is composed of a laminate of wide spring members to permit the application of a predetermined pressure without the use of thick, expensive, or machined parts and to prevent overstressing of the spring.

BRIEF DESCRIPTION OF THE DRAWING

The present invention will be more fully described hereinafter with reference to the accompanying drawing wherein.

DETAILED DESCRIPTION OF THE PREFERRED EMBODIMENT

Figure 1:
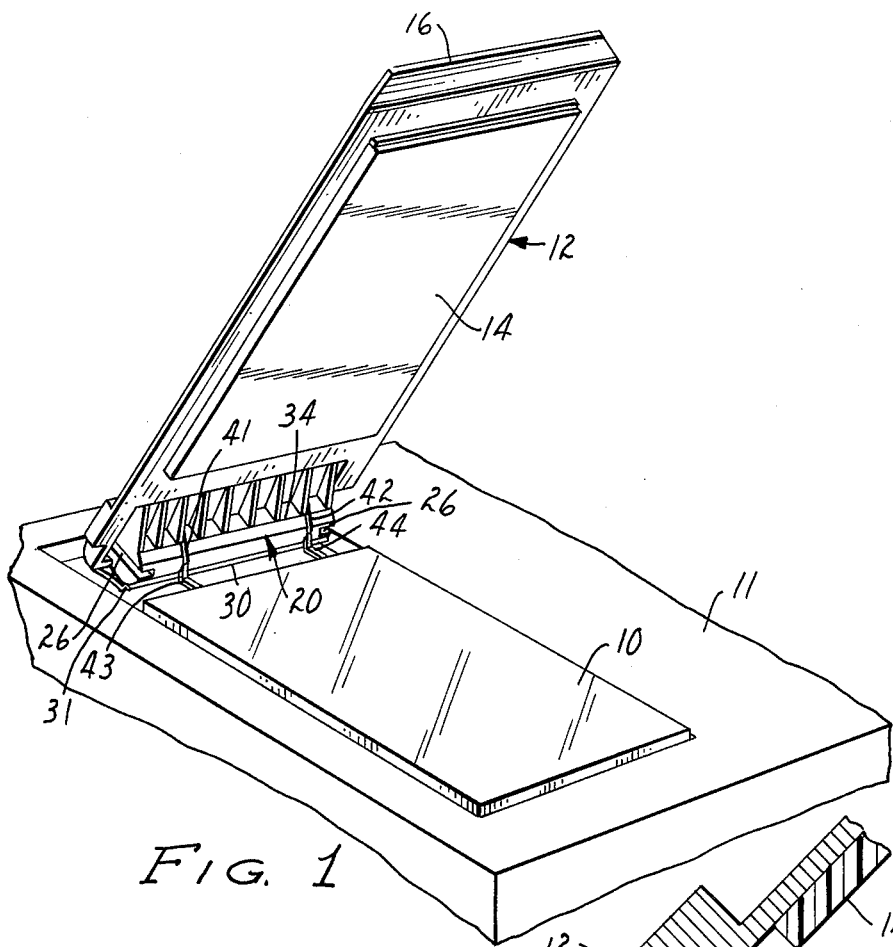
FIG. 1 is a perspective view of the platen of a copy machine and a cover thereon positioned in the partially open position in relationship to a glass platen, with the cover having a hinge structure corresponding to the present invention.
Figure 2:
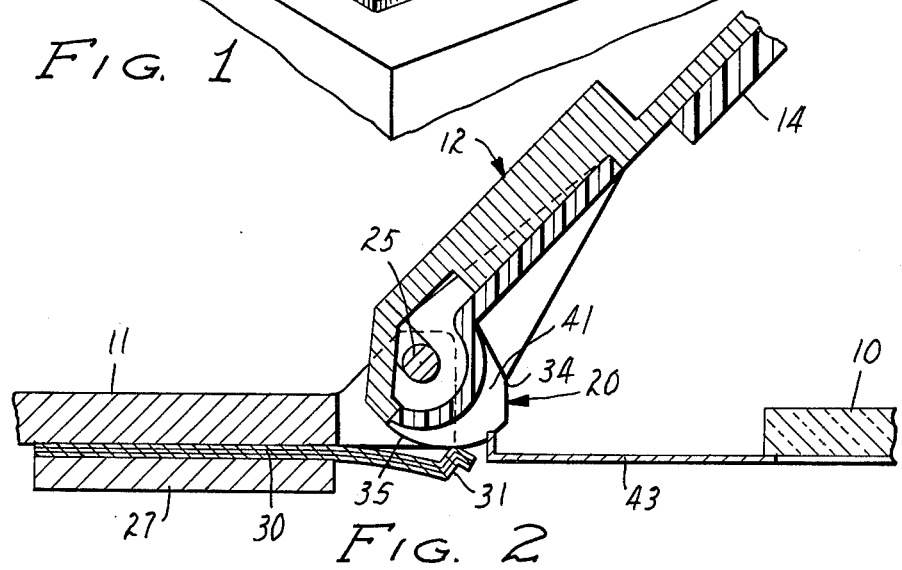
FIG. 2 is a fragmentary detailed sectional view of the latching spring hinge of the present invention.

As illustrated in FIG. 1 there is conventionally, on a copy machine for the copying of graphic originals by imparting an image therefrom to a photosensitive member, a transparent glass platen 10 upon which an original to be copied may be placed in the copy machine generally designated 11. This original document is held flat against the platen 10 by the use of a cover 12 which is large enough to cover the platen 10 and which usually has a resilient pad 14 engageable with the document. The cover 12 is hinged along one edge to permit the same to be raised and lowered to allow the insertion and removal of documents from the platen.

The present invention is directed to an improved spring latching hinge wherein the cover can be easily raised from the platen but which need not be raised to a position perpendicular to the platen or moved therepast to an overcenter position against a stop to prevent the same from falling back toward the platen as the original document is inserted or removed from the surface of the platen.

Cover 12 is formed of a molded polymeric foam and is provided at one edge with a lip 16 which facilitates the grasping of the cover to raise the cover. The pad 14 is formed of a resilient material and is adhered to the undersurface of the cover 12. Along the edge of the cover opposite the lip 16 is a molded support member 20 for forming one portion of the hinge. This member 20 is held to the edge of the cover 12 by means of suitable fastening members placed through openings therein and is formed of a molded thermoplastic material, e.g. an acetal homopolymer which is filled with 20 percent glass to provide increased strength. The polymer is a smooth bearing-type material and can rotate about a fixed shaft 25 positioned through journals 26 at each end of the support member 20 and partial journal surfaces opposite the cam surface. This relatively inexpensive material forming the wide cam surface will withstand the force applied thereto by the spring as the force is applied along the width of the cam reducing the force per unit area.

Figure 3:
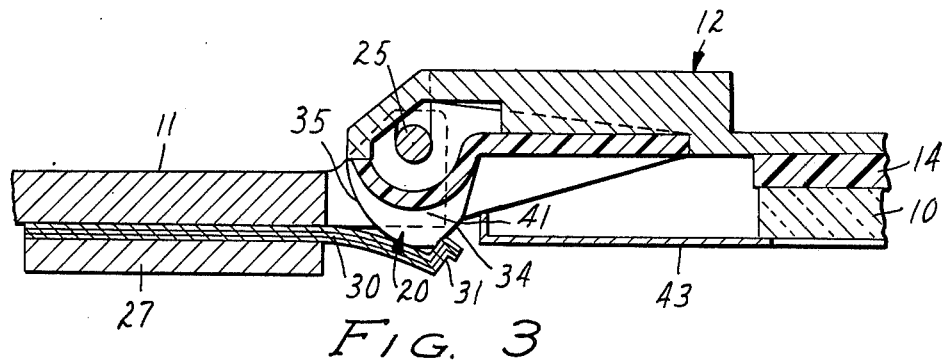
FIG. 3 is a second fragmentary detailed sectional view of the latching spring hinge of the present invention showing the cover in the closed position.

The spring, generally designated 30, is a leaf spring which is cantilever mounted to the frame of the copy machine 11 by a bracket member 27. The spring 30 comprises three similar leaves and the leaves are formed by stampings from spring steel. The leaves are formed with a bend 31 in the free end directed toward the cam and then sharply away to define a force directing edge. The edge is located to engage a reversed angle of the cam defining a locking surface portion such that the spring is capable of providing positive movement onto the cam surface to force the cover 12 downward against the platen 10. This is illustrated in FIG. 3 wherein the spring force is applied normal to a locking surface portion 34 of the cam and provides a resultant force on the cam urging rotation of the member 20 and cover clockwise about the fixed shaft 25 to apply a downward force for the cover 12 against the platen 10. This resultant force is applied when the cover is against the platen or positioned between about 0 to 5 degrees with respect to the plane of the platen.

Joined at an edge to the locking surface portion of the cam is a transition surface 35 wherein the force of the spring 30 with respect to each position along the transition surface of the cam can be determined such that the shape of the cam surface positioned in opposed relation to the bend in the spring is such that the force against the cam profile produces a torque equal to and therefore counterbalanced with the weight of the cover. This is desirable such that between about 20° through 90° in the arc of movement of the cover off the platen the spring force will maintain the cover in the fixed raised position.

The force of the spring against the cam profile is determined by the following formula $$F = T/R \, (\cos \beta \pm \mu \sin \beta)/(\sin \alpha \pm \mu \cos \alpha)$$

wherein:
T = the torque caused by the weight of the cover about the shaft 25,
R = the radius from the axis of the shaft 25 to the cam surface,
α = the angle between a line normal to the cam surface and a line through the axis of the shaft 25,
β = the angle between a line normal to the cam surface and a line representing the direction of spring force,
μ = coefficient of friction of the material of the support member 30.

In an illustrative example with the cover positioned at 45° with respect to the platen and with the coefficient of friction (μ) equal to 0.03, α equals 19° and β equals 2°, a cover applying a torque of 14 inch pounds, and the distance or radius to the cam surface being equal to 0.58 inches, the resultant force applied by the spring against the cam would equal 68.2 pounds. The force per unit area applied by the spring 6 inches wide with a contact area of approximately 0.01 square inches would be approximately 6820 pounds per square inch.

This same spring 30 applies a frictional drag against the elongated axially extending cam surface on the support member 20, which frictional force together with the torsional force restricts motion of the cover toward the platen in any of its positions between about 20° and 90° with relationship to the platen.

The angle of the cam surface on the support member 20 can be determined mathematically for each point along the cam surface utilizing the above formula. The center or centers of each arcuate segment resulting in the cam profile will aproach the axis of the fixed shaft 25 as the cover moves closer to 90° in that the center of gravity of the cover moves to or closer to a position through the axis of the fixed shaft 25. The cam profile may be formed by a simple arc from a center spaced from the center of the shaft 25.

A gap is normally formed between the edge of the platen 10 and the support member 20. Therefore, the support member is formed with two grooves 41 and 42, and two fingers 43 and 44 are secured to the machine frame and extend across the gap, and they have upturned ends which fit into the grooves 41 and 42. The fingers 43 and 44 restrict documents from falling into the machine through the gap.

Having thus described the invention with reference to a preferred embodiment, it is to be understood that the invention is not so limited but is defined in the appended claims.

What is claimed is:

1. In a copy machine having a platen for supporting an original document for the purpose of exposing the same to impart an image to a photosensitive member and having a cover pivotally mounted along one edge thereof to cover and hold the original in place on the platen, the improvement comprising a latching spring in the form of a wide leaf spring positioned along said one edge of the cover, a cam secured to the cover and extending axially the width of the leaf spring and engaging the leaf spring along its length, said cam having a substantially planar locking surface portion which, when engaged by said leaf spring, will apply a torque to the cover forcing the same about the pivot axis of the cover toward said platen, and an arcuate transition surface portion described by an arc eccentric to the pivot axis of said cover which transition surface portion engages said spring and provides a torque on the cover as said cover is moved from said platen, the torsional force of which is sufficient to counterbalance the weight of the cover and hold the cover in a fixed position when the cover is raised from the platen to an angle of between about 20 and 90°.

2. The improvement according to claim 1 wherein the locking surface portion of the cam and the spring produce a closing force on the cover to move it toward the platen when the cover is positioned between about 5° and 0° with respect to the platen.

3. The improvement according to claim 1 wherein said leaf spring comprises several leaves to restrict fatigue on said spring.

4. The improvement of claim 3 wherein said spring leaves are formed with a bend in the free end thereof to form a force defining edge to engage said transition surface portion of the cam and said locking surface portion which is angularly related to said transition surface portion and joined thereto at an edge.

5. The improvement of claim 1 wherein said cam is formed of a thermoplastic material and the spring is formed of a plurality of leaves of spring steel.

* * * * *